(12) United States Patent
Hasch et al.

(10) Patent No.: US 7,385,152 B2
(45) Date of Patent: Jun. 10, 2008

(54) SWITCH MODULE

(75) Inventors: Martin Hasch, Schwieberdingen (DE); Rainer Lipfert, Heilbronn (DE); Karl Simonis, Illingen (DE); Roland Gruener, Tamm (DE); Bernd Binder, Sersheim (DE); Juergen Suchanek, Gueglingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 15 days.

(21) Appl. No.: 10/580,655

(22) PCT Filed: Nov. 20, 2004

(86) PCT No.: PCT/EP2004/013207

§ 371 (c)(1),
(2), (4) Date: May 25, 2006

(87) PCT Pub. No.: WO2005/055261

PCT Pub. Date: Jun. 16, 2005

(65) Prior Publication Data

US 2007/0125631 A1   Jun. 7, 2007

(30) Foreign Application Priority Data

Dec. 5, 2003 (DE) .................. 103 57 667
Dec. 5, 2003 (DE) .................. 103 57 668
Jul. 8, 2004 (DE) .............. 10 2004 033 447

(51) Int. Cl.
*H01H 3/16* (2006.01)
(52) U.S. Cl. .................. 200/61.27; 200/61.54
(58) Field of Classification Search .. 200/61.54–61.57, 200/61.3–61.38, 335
See application file for complete search history.

(56) References Cited

U.S. PATENT DOCUMENTS

| 3,718,784 A | * | 2/1973 | Wilkinson | ............... 200/61.27 |
| 4,273,971 A | * | 6/1981 | Tregurtha | ...................... 200/4 |
| 4,414,442 A | | 11/1983 | Berginski | |
| 6,479,771 B1 | * | 11/2002 | Kubota | .................... 200/61.27 |
| 6,534,733 B2 | * | 3/2003 | Schwartz et al. | ........ 200/61.54 |

FOREIGN PATENT DOCUMENTS

| DE | 199 43 490 | 4/2001 |
| DE | 102 38 269 | 3/2003 |
| DE | 102 09 939 | 10/2003 |

* cited by examiner

*Primary Examiner*—Elvin Enad
*Assistant Examiner*—Lheiren Mae A Anglo
(74) *Attorney, Agent, or Firm*—Paul Vincent

(57) ABSTRACT

The invention relates to a switch module comprising a selector lever that is pivotally mounted in a bearing housing. The selector lever comprises two opposing, projecting trunnions and the bearing housing has receiving openings, at least sections of the latter being configured in polygonal form. A force is exerted on the selector lever, together with its trunnions, in the direction of one vertex.

9 Claims, 4 Drawing Sheets

SWITCH MODULE

This application is the national stage of PCT/EP2004/013207 filed on Nov. 20, 2004 and also claims Paris Convention priority of DE 103 57 668.1 filed on Dec. 5, 2003, DE 103 57 667.3 filed on Dec. 5, 2003, and DE 10 2004 033 447.1 filed on Jul. 8, 2004.

BACKGROUND OF THE INVENTION

The invention concerns a switch module, in particular, comprising a control lever which is pivotably disposed in a bearing housing, the control lever having two opposite, freely projecting bearing pins and the bearing housing having receiving openings.

Switch modules of this type are used e.g. as steering column switches in automotive vehicles. Steering column switches of this type serve e.g. as light switches, indicator switches, windscreen wiper switches etc. Since the control lever is relatively long and since vehicles constantly vibrate, the bearings must meet high demands with regard to service life and lack of play. In particular, the bearing play causes noise which may be disturbing. Conventional bearings have a round receiving opening for receiving a round bolt. Due to the extreme temperature fluctuations to which such switch modules are subjected, jamming of the round bolt in the receiving opening must be reliably prevented to ensure proper pivoting of the control lever. For this reason, the round bolts disposed in the receiving openings always have play which can, however, cause the above-mentioned problems.

It is therefore the underlying purpose of the invention to provide a switch module which causes less noise.

SUMMARY OF THE INVENTION

This object is achieved in accordance with the invention by a switch module of the above-mentioned type in that the receiving openings have, at least in sections, a polygonal shape and the control lever with bearing pins is loaded towards a corner of the receiving openings.

The polygonal design of the receiving opening generates discrete contact surfaces for the bearing pin, such that the bearing pin which is urged with a defined force towards the receiving opening or towards a corner thereof, assumes a defined position. The contact surface in the receiving opening may thereby be flat, convex or concave. The corner of the receiving opening receiving the bearing pin is preferably formed by a V-shaped section, such that the bearing pin abuts the two sides of the receiving area. Lifting of the bearing pin from the contact surface is prevented in that the bearing pin abuts with a defined, and in particular, adjustable force. The play may be relatively large without producing rattling noises.

In a further development of the invention, the bearing housing forms a bearing block which, in turn, comprises two bearing pins whose axes extend orthogonal to the axes of the receiving openings. The module housing has two receiving openings, which also have a polygonal shape in sections, for the bearing pins of the bearing block. For this reason, the bearing pins of the bearing block are also held in the polygonal receiving openings without play and abut the contact surfaces under a predetermined force load.

In accordance with the invention, the bearing pins of the control lever and the bearing pins of the bearing block form a universal joint together with the receiving openings in the bearing block and the receiving openings in the module housing. A user can pivot the control lever towards the top, towards the bottom, towards the front and also towards the rear, wherein all pivot directions or all pivot motions have a balanced play.

A contact piece guidance is preferably disposed opposite to the control lever relative to the bearing and is supported on a wall of the module housing. This support force in accordance with the invention, which is provided by a helical pressure spring, forces the bearing pins of the control lever into the receiving openings of the bearing block and forces the bearing pins of the bearing block into the receiving openings of the module housing. One single spring element is sufficient to compensate for the play. Instead of a helical pressure spring, other components may also be used for generating the pressure, in particular, even material collected in the region of the receiving openings, e.g. spring lips and the like, wherein spring elements may also be provided directly in the region of the receiving openings to act on the bearing pins.

In a preferred embodiment, the receiving opening is substantially triangular. The bearing pin is disposed between the two sides of the rectangle, wherein the opening angle thereof adjusts the pressure and therefore also the frictional moment of the bearing pin in the receiving opening.

In accordance with a preferred embodiment of the invention, the control lever is loaded in the direction of its operating end facing a user. This is effected in a simple manner through engagement of a pressure spring on the end opposite to the operating end, as was mentioned above.

Further advantages, features and details of the invention can be extracted from the dependent claims and the following description which describes in detail a particularly preferred embodiment with reference to the drawing. The features shown in the drawing and explained in the description and the claims may be essential to the invention either individually or collectively in arbitrary combination.

DESCRIPTION OF THE PREFERRED EMBODIMENT

Figure 1:
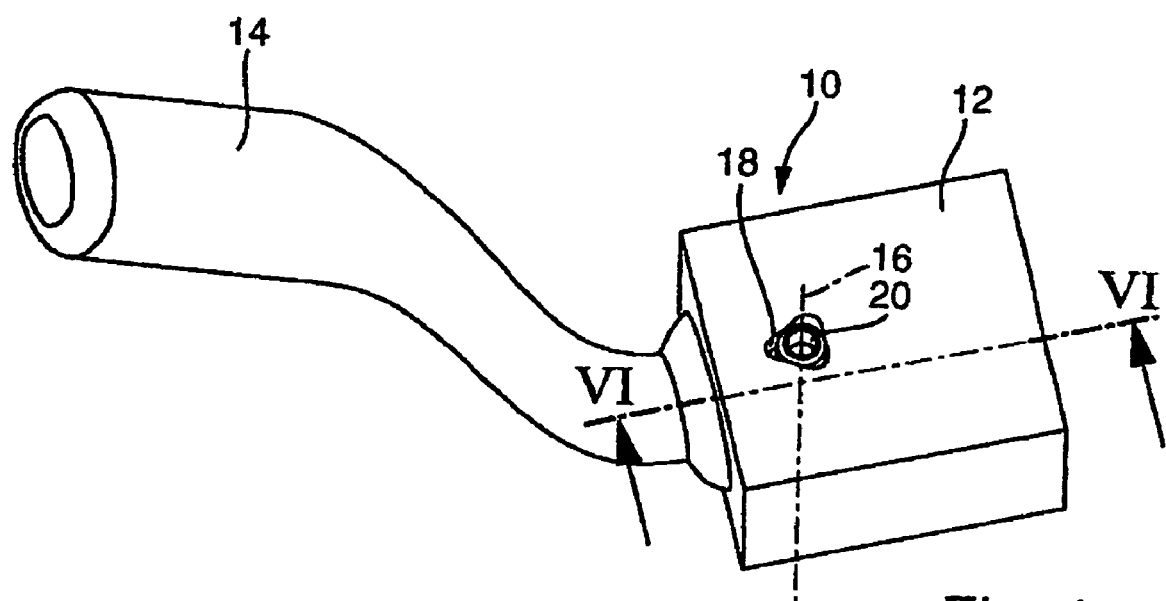
FIG. 1 shows a perspective view of a switch module.

FIG. 1 shows a switch module which is designated in total with 10, and which is used e.g. in the form of a steering column switch. Indicator, windscreen wipers, lights and the like can e.g. be switched with such a switch module 10. The switch module 10 comprises a module housing 12 which is only shown by way of example. A control lever 14 projects from the module housing 12 and is disposed in the module housing 12 to be pivotable about a first axis 16. Towards this end, the module housing 12 has two oppositely disposed receiving openings 18 which each bear one bearing pin 20.

Figure 2:
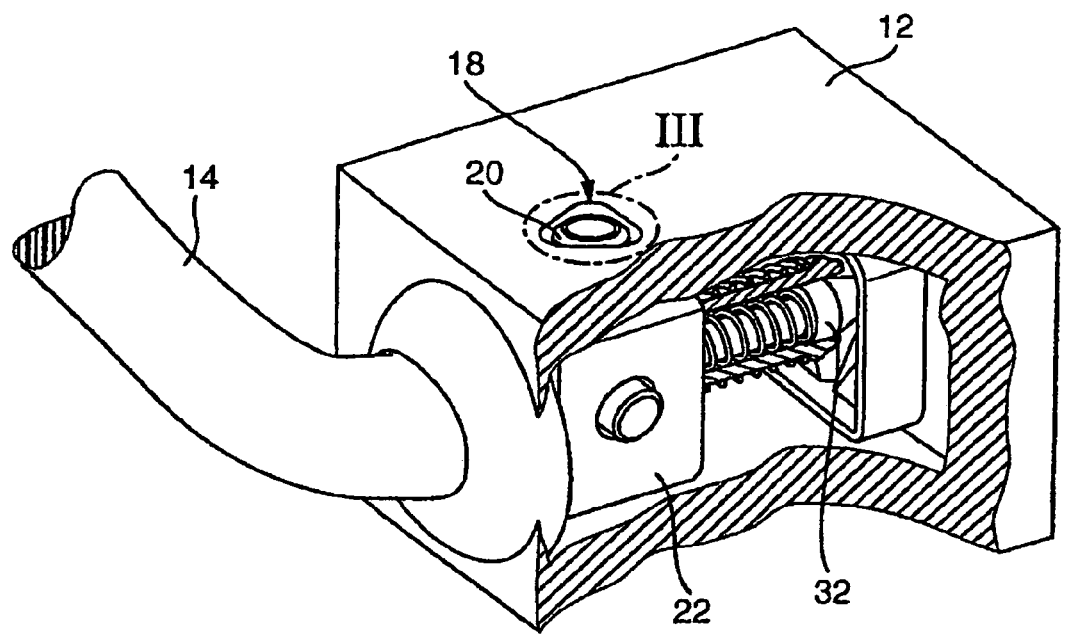
FIG. 2 shows the switch module in accordance with FIG. 1, partly broken open.

As seen in FIG. 2, the bearing pin 20 projects from a bearing block 22, wherein the bearing block 22 itself has receiving openings 24 (also shown in FIG. 4), into which bearing pins 26 engage which are disposed on a contact piece guidance 28. These bearing pins 26 form a second pivot axis 30 which is orthogonal to the first pivot axis 16.

Figure 7:
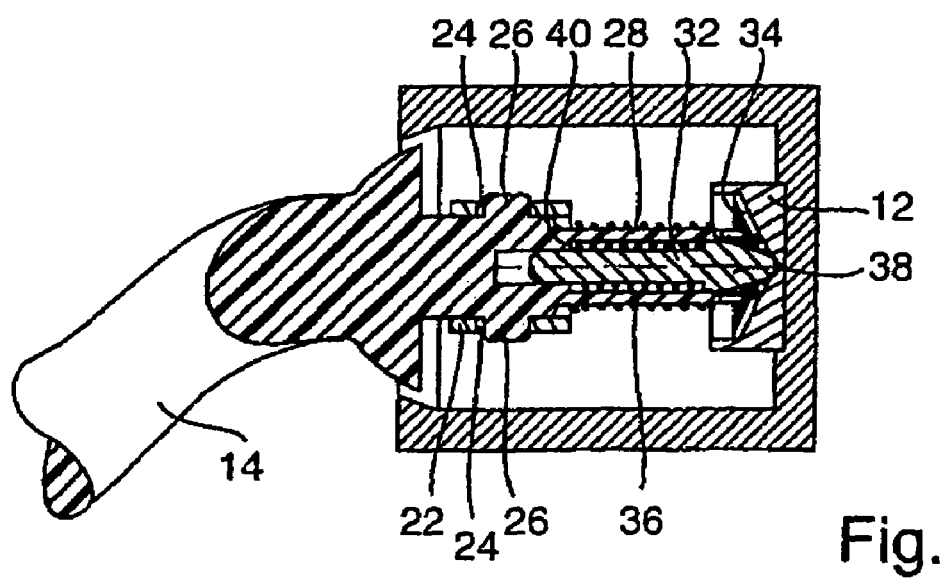
FIG. 7 shows a section VII-VII in accordance with FIG. 6.

FIG. 7 shows that the control lever 14 is integral with the contact piece guidance 28 on the other side of the bearing, wherein the contact piece guidance 28 is hollow and is axially guided by a stop pin 32. Upon actuation of the control lever 14, the stop pin 32 runs on a connecting member 34 formed in the module housing 12 and is supported thereon under the force of a helical pressure spring 36.

Figure 4:
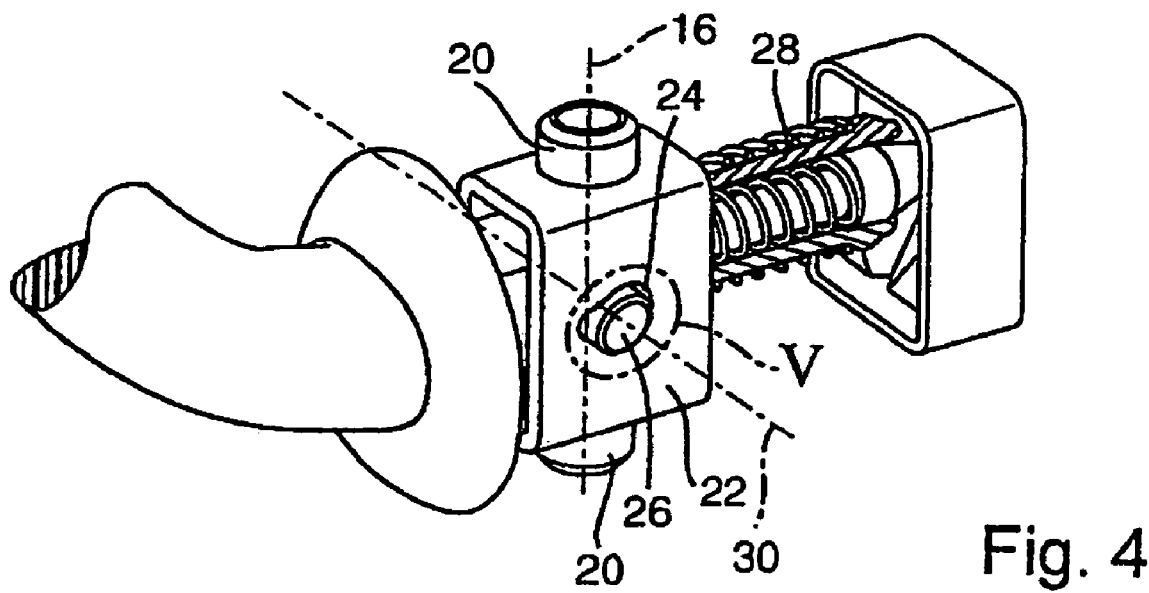
FIG. 4 shows a perspective view of the section of the control lever disposed in the module housing, including bearing block.
Figure 5:
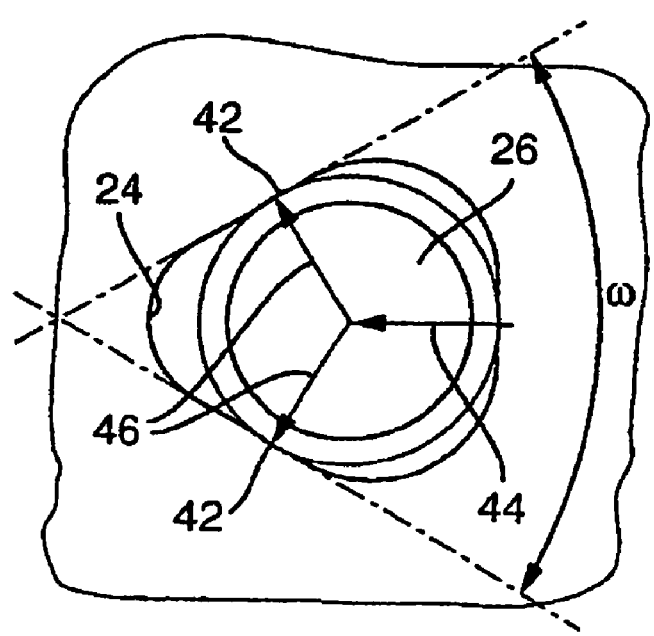
FIG. 5 shows an enlarged view of a section V in accordance with FIG. 4.
Figure 6:
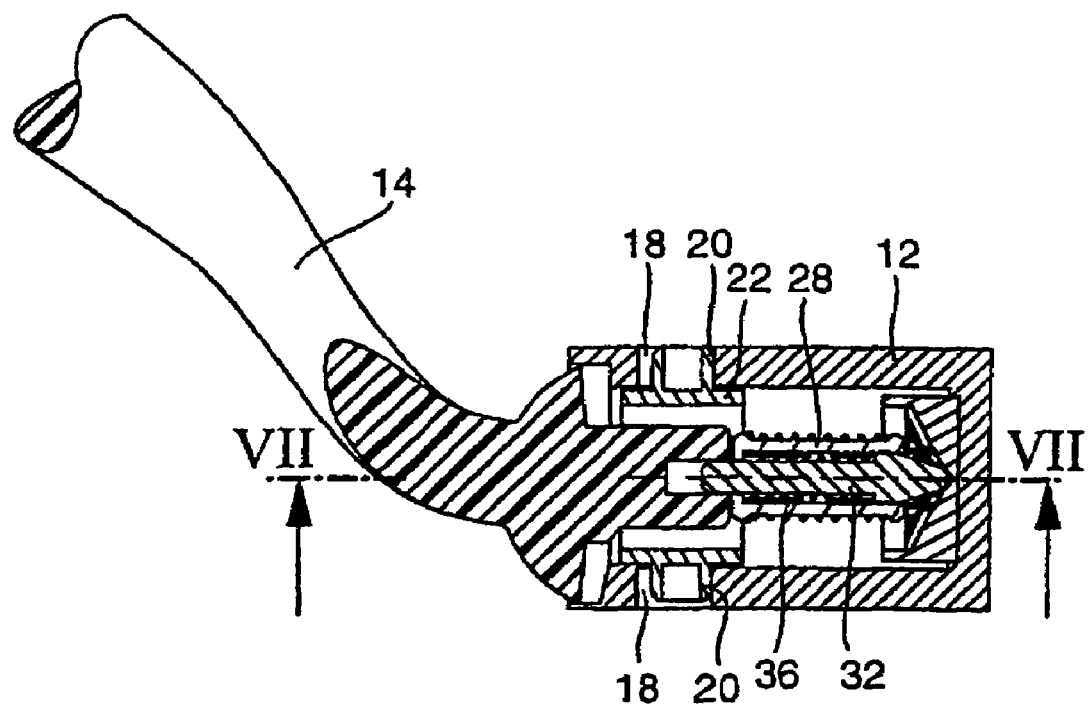
FIG. 6 shows a section VI-VI in accordance with FIG. 1.

The helical pressure spring 36 is disposed between a thickened free end 38 of the stop pin 32 and a shoulder 40 of the contact piece guidance 28 such that the force of the helical pressure spring 36 forces the contact piece guidance 28 towards the left in FIG. 7 and out of the module housing 12, forcing the bearing pins 26 of the contact piece guidance 28 towards the two sides 42 of the polygonal receiving openings 24 (FIGS. 4 and 5).

The arrow 44 (FIG. 5) shows the force of the spring 36 and the arrows 46 show the pressure of the bearing pins 26 acting on the sides 42. A defined frictional moment between the bearing pins 26 and the sides 42 is adjusted through changing the angle Ω and by changing the diameter of the bearing pins 26.

Figure 3:
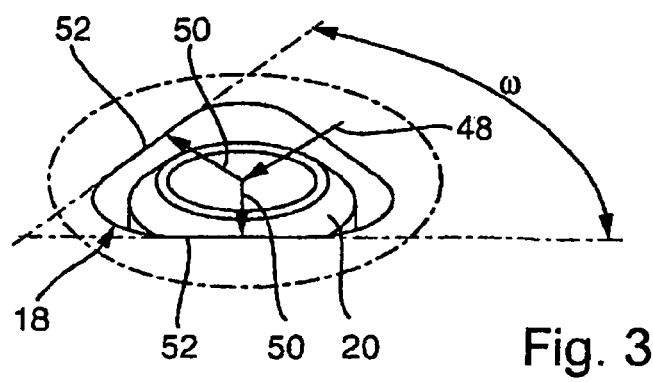
FIG. 3 shows an enlarged view of a section III of FIG. 2.

Since the bearing pins 26 are supported in the receiving opening 24, the bearing block 22 is also forced to the left-hand side such that the bearing pins 20 of the bearing block 22 are pressed into the receiving openings 18 with force 48 (FIG. 3), where they abut the sides 52 of the receiving openings 18 under load 50. Also in this case, a defined frictional moment of the bearing pin 20 in the receiving opening 18 can be adjusted through the angle Ω and the diameter of the bearing pin 20.

In any event, all bearing pins 20 and 26 are disposed in their polygonal receiving openings 18 and 24 under a certain pre-tensioning force, which ensures compensation for any play.

We claim:

1. A switch module comprising:
   a bearing housing with two first receiving openings each opening having a polygonal section with two adjacent sides defining a corner;
   a control lever pivotably disposed in said bearing housing via two opposite, freely projecting first bearing pins disposed in said first receiving openings, said first bearing pins aligned along and intersected by a first pivot axis about which said control lever rotates; and
   means for urging said control lever and said first bearing pins towards said corners of each of said two first receiving openings, wherein said first bearing pins remain seated against said two adjacent sides of each first receiving opening independent of a pivot position of said control lever.

2. The switch module of claim 1, wherein said bearing housing is a bearing block having two second bearing pins intersecting a second pivot axis which is orthogonal to said first pivot axis.

3. The switch module of claim 2, further comprising a module housing having two second receiving openings with polygonal sections, said second openings disposed along said second pivot axis to accept said two second bearing pins of said bearing block.

4. The switch module of claim 3, wherein said second receiving openings are substantially triangular.

5. The switch module of claim 1, wherein said urging means comprise a contact piece guidance disposed opposite said control lever relative to said first bearing pins and supported on a wall of a module housing.

6. The switch module of claim 1, wherein said first receiving openings are substantially triangular.

7. The switch module of claim 1, wherein said urging means comprise a spring.

8. The switch module of claim 1, wherein said control lever is urged towards an operating end thereof facing a user.

9. A switch module comprising:
   a bearing housing with two first receiving openings each opening having a polygonal section with two adjacent sides defining a corner;
   a control lever pivotably disposed in said bearing housing via two opposite, freely projecting first bearing pins disposed in said first receiving openings, said first bearing pins aligned along and intersected by a first pivot axis about which said control lever rotates; and
   means for urging said control lever and said first bearing pins towards said corners of each of said two first receiving openings, wherein said first bearing pins remain seated against said two adjacent sides of each first receiving opening independent of a pivot position of said control lever, wherein said bearing housing is a bearing block having two second bearing pins intersecting a second pivot axis which is orthogonal to said first pivot axis, and further comprising a module housing having two second receiving openings with polygonal sections, said second openings disposed along said second pivot axis to accept said two second bearing pins of said bearing block, wherein said first bearing pins of said control lever and said second bearing pins of said bearing block form a universal joint together with said first receiving openings in said bearing block and said second receiving openings in said module housing.

* * * * *